Figure 1:
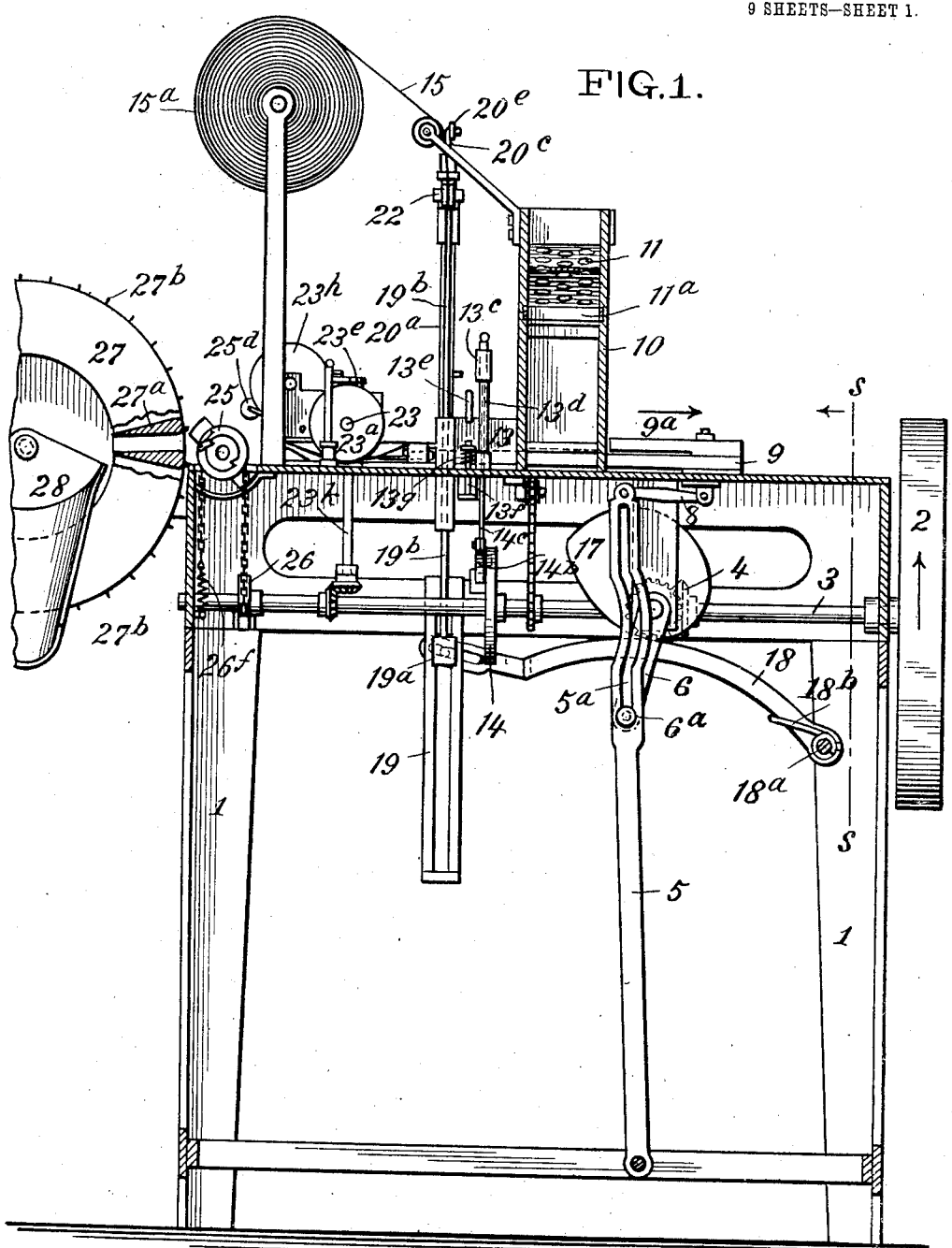

No. 832,766. PATENTED OCT. 9, 1906.
A. ANITUA.
MACHINE FOR WRAPPING OR PACKING SMALL ARTICLES.
APPLICATION FILED APR. 8, 1901.

9 SHEETS—SHEET 1.

WITNESSES: INVENTOR
Agapito Anitua
BY
Benjamin Price
ATTORNEY

No. 832,766. PATENTED OCT. 9, 1906.
A. ANITUA.
MACHINE FOR WRAPPING OR PACKING SMALL ARTICLES.
APPLICATION FILED APR. 8, 1901.

9 SHEETS—SHEET 2.

WITNESSES:
INVENTOR
BY
ATTORNEY

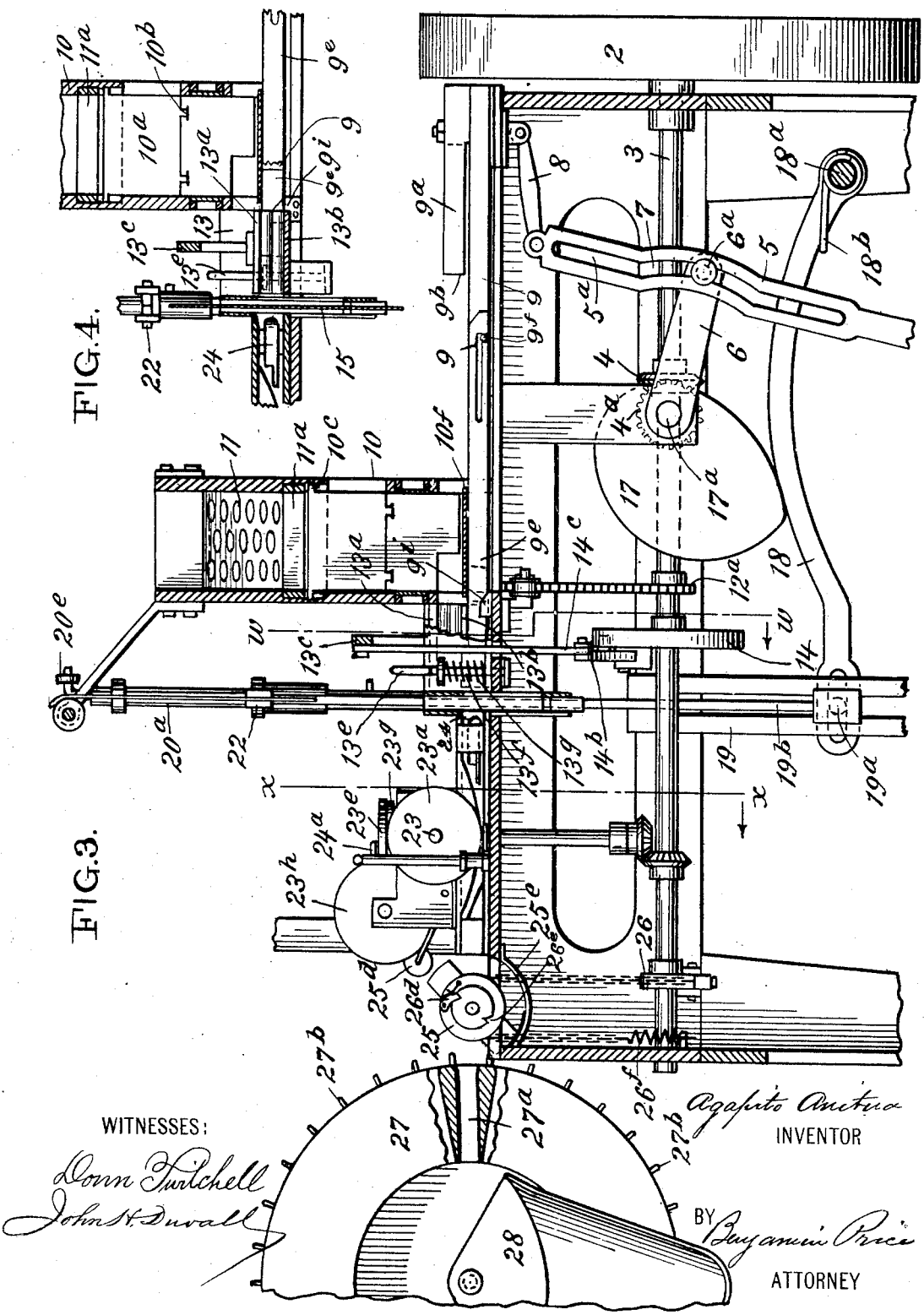

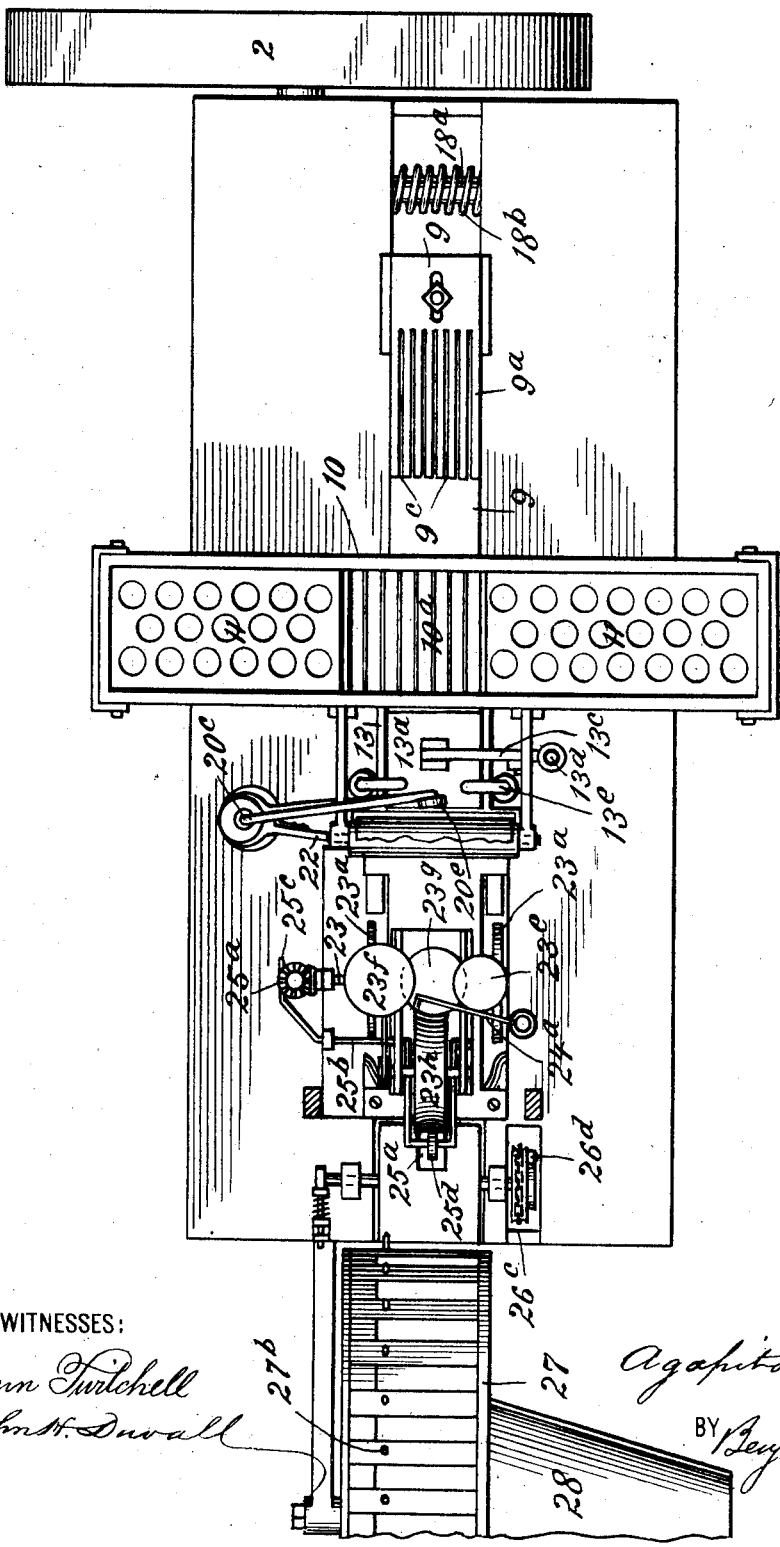

No. 832,766. PATENTED OCT. 9, 1906.
A. ANITUA.
MACHINE FOR WRAPPING OR PACKING SMALL ARTICLES.
APPLICATION FILED APR. 8, 1901.

9 SHEETS—SHEET 5.

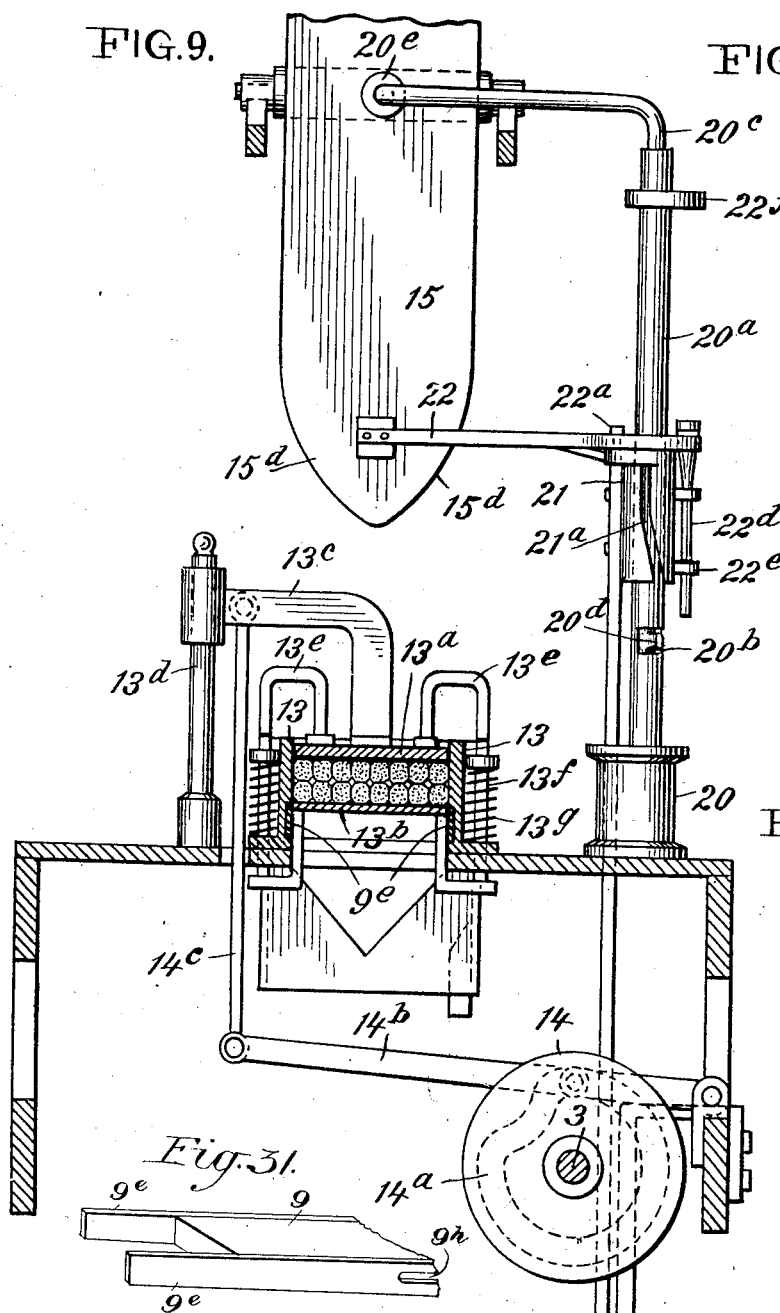

No. 832,766. PATENTED OCT. 9, 1906.
A. ANITUA.
MACHINE FOR WRAPPING OR PACKING SMALL ARTICLES.
APPLICATION FILED APR. 8, 1901.
9 SHEETS—SHEET 7.
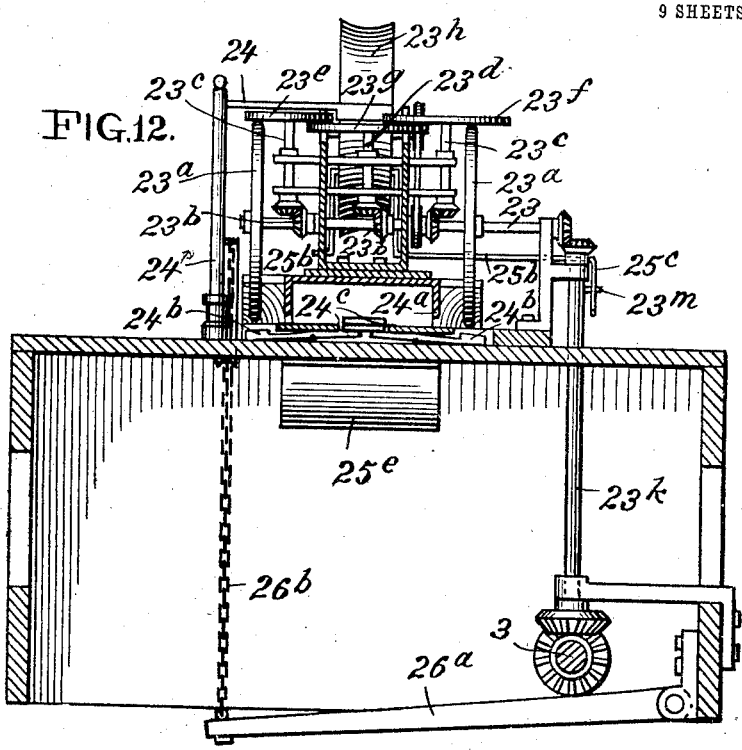
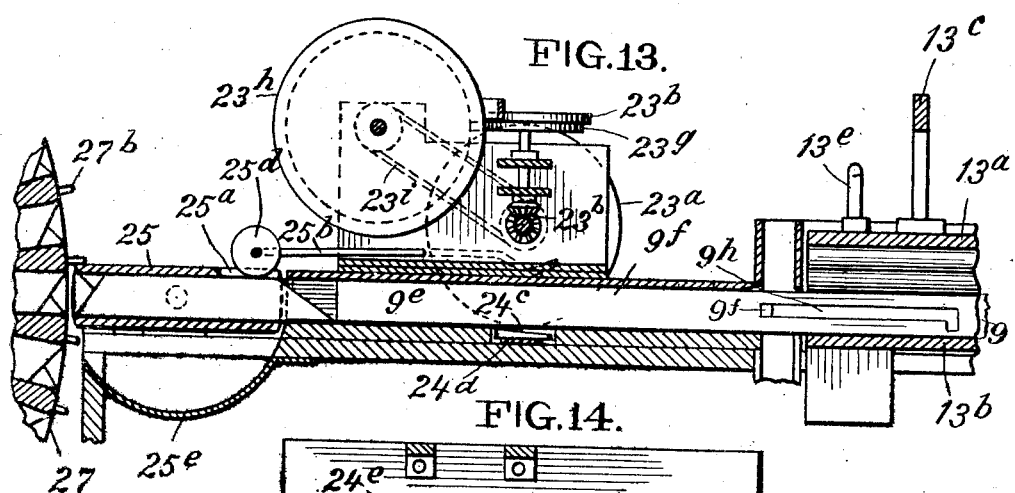
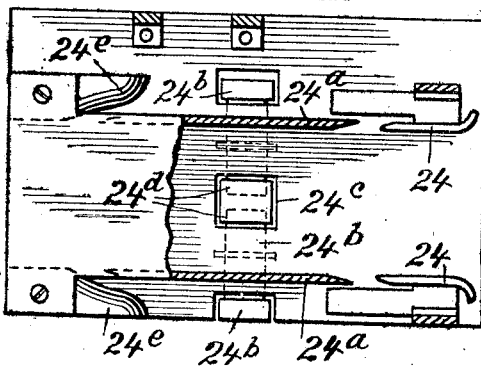
WITNESSES:
INVENTOR
BY
ATTORNEY No. 832,766. PATENTED OCT. 9, 1906.
A. ANITUA.
MACHINE FOR WRAPPING OR PACKING SMALL ARTICLES.
APPLICATION FILED APR. 8, 1901.
9 SHEETS—SHEET 8.
FIG.15.
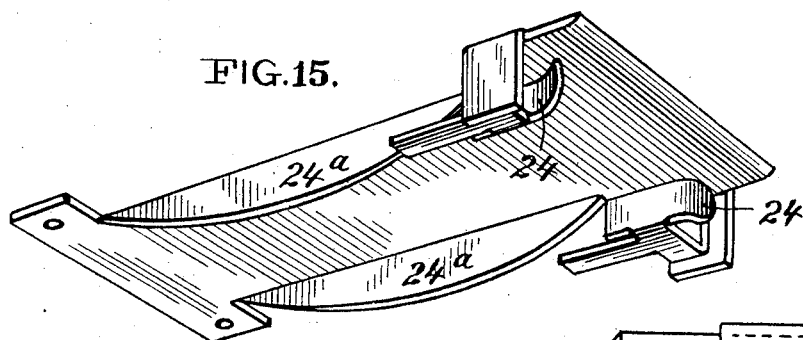
FIG.16.
FIG.17.
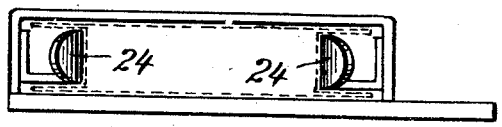
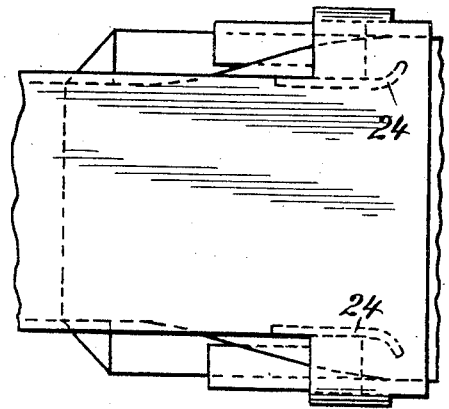
FIG.18.
FIG.19. FIG.20.
FIG.21.
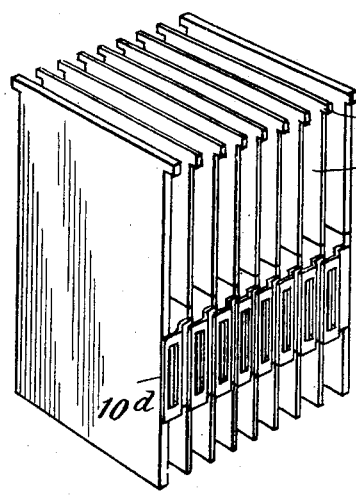
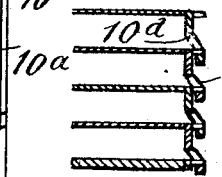
FIG.22.
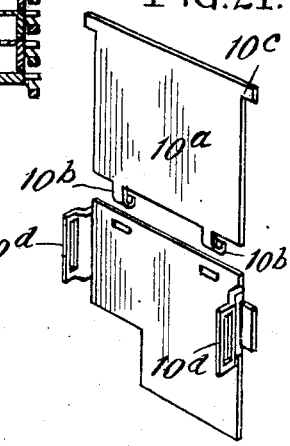
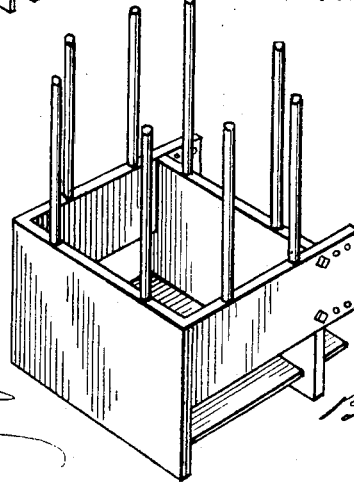
WITNESSES:
Lynn Twitchell
John H. Duvall
INVENTOR
Agapito Anitua
BY
Benjamin Price
ATTORNEY No. 832,766. PATENTED OCT. 9, 1906.
A. ANITUA.
MACHINE FOR WRAPPING OR PACKING SMALL ARTICLES.
APPLICATION FILED APR. 8, 1901.

9 SHEETS—SHEET 9.

WITNESSES:
Donn Twitchell
John N. Duvall

INVENTOR
Agapito Anitua
BY
Benjamin Price
ATTORNEY

THE NORRIS PETERS CO., WASHINGTON, D. C.

UNITED STATES PATENT OFFICE.

AGAPITO ANITUA, OF HAVANA, CUBA, ASSIGNOR, BY MESNE ASSIGNMENTS, TO AMERICAN WRAPPING AND BOX MACHINE COMPANY, OF NEW YORK, N. Y., A CORPORATION OF NEW YORK.

MACHINE FOR WRAPPING OR PACKING SMALL ARTICLES.

No. 832,766.   Specification of Letters Patent.   Patented Oct. 9, 1906.

Application filed April 8, 1901. Serial No. 54,936.

*To all whom it may concern:*

Be it known that I, AGAPITO ANITUA, a citizen of Cuba, residing in the city of Havana, Cuba, have invented a new and useful Machine for Wrapping or Packing Small Articles—such as cigarettes, cakes of soap, chocolates, cards, or other articles of like character—of which the following is a specification.

The features of my invention, as hereinafter set forth, will be illustrated and described in connection with the packing or wrapping of cigarettes, while the principle of the machine may be readily applied to other articles, as above mentioned.

The various stages of wrapping or packing said articles and the mechanisms for performing the work are illustrated in the drawings, and consist of a holder wherein the articles to be wrapped are deposited, devices for regulating, compressing, and adjusting said articles within the holder, a wrapper of suitable material—such as paper, cloth, or cardboard—devices for taking the wrappers in proper lengths and shape and presenting them to the article to be packed, mechanism for folding the wrapper over the article, pasting and doubling over the edges and ends of the wrapper, and finally discharging the same in its package ready for market.

The accompanying drawings illustrate the invention, of which—

Figure 2:
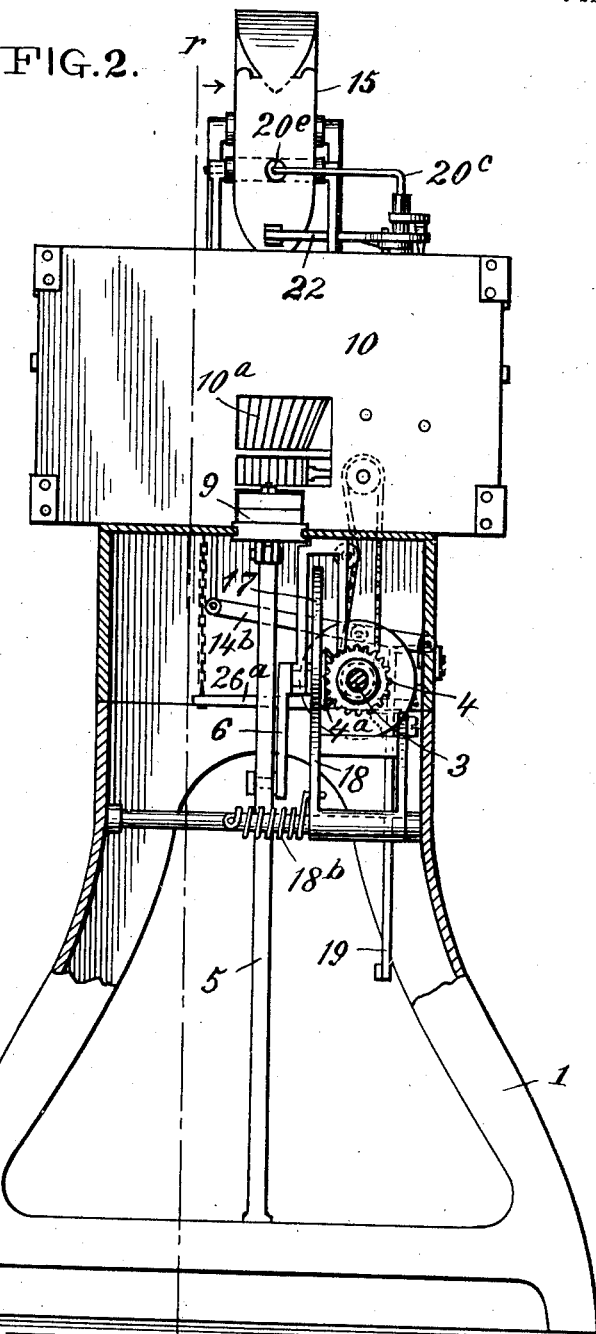
Figure 6:
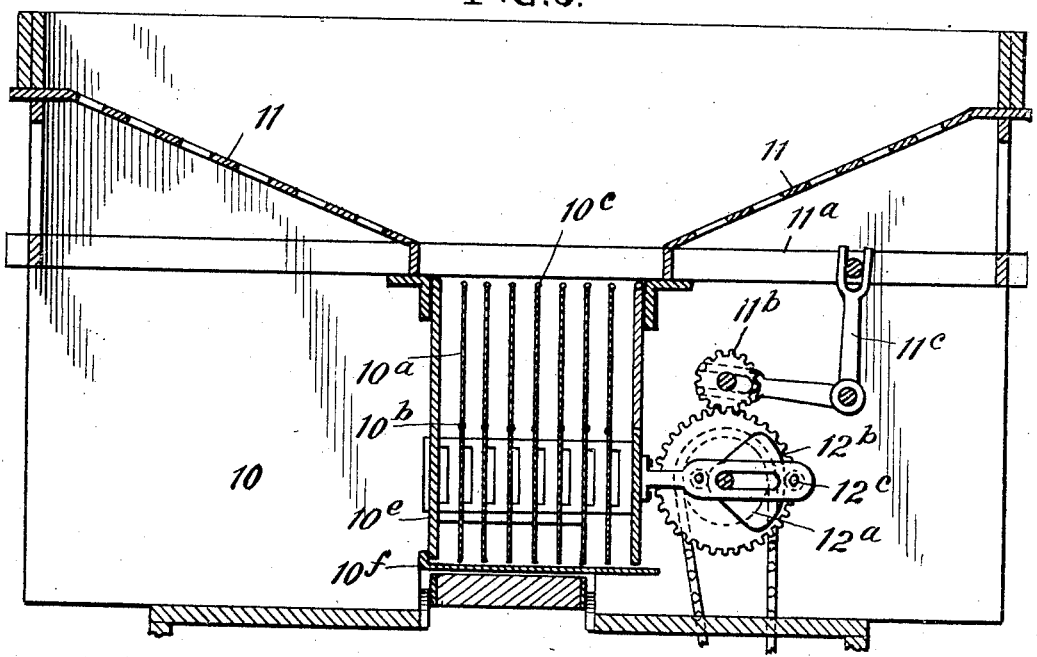
Figure 8:
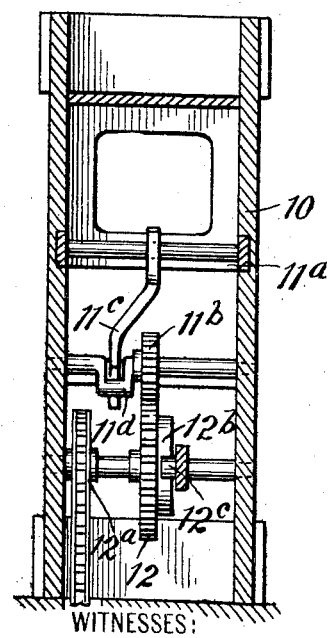
Figure 7:
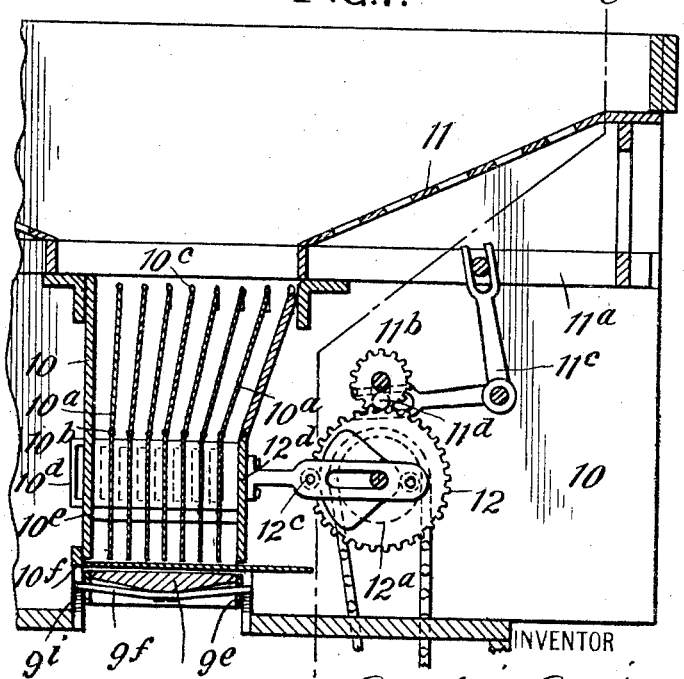
Figure 23:
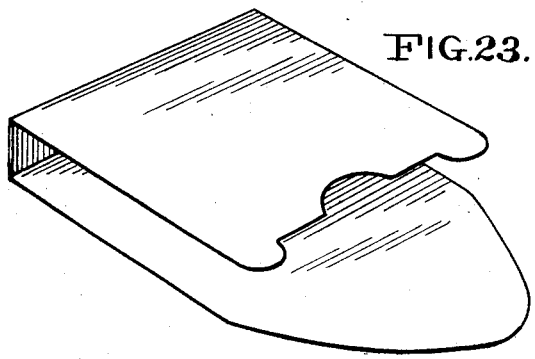

Figure 1 is a sectional elevation of the device, taken on line $r\ r$ of Fig. 2, showing the plunger as having performed one operation and on its return to place of starting; Fig. 2, an end view of the same, partly in section, taken on line $s\ s$, Fig. 1; Fig. 3, an enlarged view of Fig. 1, partly in section, with the bobbin of wrapper-blanks left out and showing the plunger returned to starting-point; Fig. 4, a sectional view of the holder, the pressing devices, and the wrapper in position to receive and be doubled over the article to be packed; Fig. 5, a top or plan view of the machine; Fig. 6, a sectional view of the holder and hopper with the devices for agitating the hopper and for compressing the holder upon the article to be packed. Fig. 7 is a view of the parts shown in Fig. 6 in different position; Fig. 8, a vertical section taken on line $t\ t$ of Fig. 7 looking to the right; Fig. 9, a view of part of the machine, partly in section, taken on line $w\ w$, Fig. 3, and showing a face view of one of the wrappers in position to be dropped in front of the article to be packed and also showing the compressing mechanism and devices for holding and separating a wrapper from the ribbon of wrapper-forms; Fig. 10, an elevation of the device for stopping and holding the wrapper-forms to be separated from the ribbon; Fig. 11, a view of the clasp or pincers which separate the wrapper-form from the ribbon and drop in front of the article to be wrapped; Fig. 12, a front sectional view of the pasting devices taken on line $x\ x$, Fig. 3; Fig. 13, a side elevation of the same, showing the rotating box in position to receive the package; Fig. 14, a top or plan view of the folder, partly in section. Figs. 15, 16, 17 are views of the devices for folding the corners and side edges of the wrapper over and about the article to be packed; Fig. 18, a perspective view of the holder used when cigarettes are to be packed; Figs. 19 and 20, sectional views of the jointed partitions in the holder; Fig. 21, a perspective view of one of the partitions, showing the hinging devices for the top and bottom parts and the connecting-links for joining them at the sides. Fig. 22 represents a box or holder of a form suitable for articles other than cigarettes. Figs. 23 to 30 show the various forms taken by the wrapper at the different stages of being folded around and about the article to be packed. Fig. 31 is a perspective view of the plunger and side plates to be used with wrappers of stiff paper or cardboard.

In the drawings, 1 is a table upon which are mounted the various parts of the device.

2 is a driving-pulley secured to a shaft 3, which imparts motion to the operating devices of the machine.

4 is a bevel gear-wheel mounted on the shaft 3, which meshes with another gear-wheel $4^a$, mounted on a shaft suitably journaled in the frame, to which shaft is secured the crank 6, provided with a crank-pin $6^a$. The lever 5, suitably pivoted to the lower part of the frame, is provided with the slot $5^a$, within which plays the crank-pin $6^a$, thereby imparting a reciprocating movement to the lever 5, which at its upper end is connected by the link 8 to the plunger 9. This plunger is suitably arranged to slide longitudinally in the frame and is provided with an overlapping piece $9^a$, leaving an open space $9^b$ between the piece and the top surface of the plunger, Figs. 1 and 3. This overlapping piece is slotted, as shown at $9^c$, Fig. 5. The purpose of the open space and the slots will be explained in describing the operation of the machine.

In the adaptation of the apparatus for packing cigarettes I have mounted on the machine a receiving or distributing box 10. This box is constructed with a series of partitions $10^a$, Figs. 6 and 7, hinged at $10^b$ and having their upper ends inserted in slots $10^c$, so that the lower parts of the partitions may be brought together in parallel lines to compress or adjust the cigarettes between the lower sections of the partitions, (see Fig. 7,) and the top edges of the upper sections may move in their slots, leaving the spaces between these partitions of full width to receive the cigarettes from the hopper. Each lower section of these partitions is coupled or linked to the adjacent section in such a manner that all sections may be moved toward and from one another or the space between the same contracted or expanded. As shown in the accompanying drawings, the couplings are provided by lugs projecting from the edges of the sections, which are movable within openings in wings $10^d$, projecting from the edges of the adjacent sections, as shown in Figs. 18, 19, 20, and 21. Suitable supporting-guides $10^e$ coact with the lower edges of the wings $10^d$, as shown in Figs. 6 and 7.

Above the box is arranged the hopper 11, suitably secured to its reciprocating base $11^a$. Mounted in suitable bearings on the frame of the machine is the cogged wheel 12, Figs. 6 and 7, which receives its motion from a sprocket-wheel $12^a$ on the shaft 3. This wheel carries the cam $12^b$, which plays between two pins $12^c$, mounted on the sliding compressor $12^d$. As the wheel and cam revolve this compressor is thrust forward to compress and adjust the cigarettes lying between the partitions in the lower part of the box, as shown in Fig. 7, and is withdrawn at the proper time to restore the partitions to normal position, as shown in Fig. 6.

Suitably journaled in the frame is a shaft carrying the pinion $11^b$, meshing with the wheel 12, and pivoted to the frame is the bell-crank lever $11^c$, whose lower arm is slotted to receive the pin $11^d$ on the pinion $11^b$. The upper arm is also slotted to receive a pin on the hopper-frame, and as the shaft $11^b$ revolves the frame and hopper are reciprocated, shaking up and adjusting the cigarettes to fall in proper position between the partitions $10^a$, thence to the lower part of the box to be compressed, as above described. At the bottom of the receiving-box there is a thin metal plate $10^f$, and below this plate there is an open space to admit the passage of the plunger 9. When the partitions are approached, as shown in Fig. 7, their edges will lie in line with the slots $9^c$ in the overhanging piece $9^a$, so as to allow this part of the plunger to pass over the plate and force two rows of the cigarettes therefrom and drop them upon the projecting part of the plunger 9 within the presser-box, where they lie on top of the plunger and between the upper and lower plates of said box.

The compressing-box, Fig. 9, is formed of two walls 13, attached to a suitable part of the frame in front of the receiving and distributing box. These walls are sufficiently apart to permit the plunger to pass between them. Confined between these walls are the upper and lower compressing-plates $13^a$ and $13^b$. Both of these plates are vertically movable. The top plate is attached to the sliding arm $13^c$, which is bent over and embraces the column or rod $13^d$, upon which it reciprocates, carrying with it the top plate lying between the walls 13. This top plate also carries the two bent rods $13^e$. The lower plate is bent under the frame, as shown, and carries the two upright rods $13^f$, around which are placed the springs $13^g$, whose upper ends are in contact with a pin secured to the rod, and the lower ends rest upon the base of the walls 13, thus keeping the lower plate suspended until the upper plate is lowered and the curved arms $13^e$ strike the ends of the rods $13^f$, and thus force the lower plate down. The mechanism for raising and lowering the upper plate is shown in Fig. 9. Upon the shaft 3 is secured a plate 14, having a cam-shaped groove $14^a$ on its surface. A lever $14^b$, suitably pivoted at one end, is provided with a pin or button working within the groove. At the other end the lever is pivoted to the rod $14^c$, which is attached to the sliding arm $13^c$, and as the shaft 3 revolves this arm is reciprocated, carrying the upper plate and the devices attached thereto with it. The cigarettes lie on the surface of the plunger just beyond or adjacent to the overhanging piece $9^a$, while the forward end of the plunger projects beyond, performing its other functions.

The cigarettes lying upon the plunger within the compressing-box remain there until forced off by the backward movement of the plunger. The metal plate $10^f$, lying behind the cigarettes, prevents them from being carried back with the plunger until they are dropped off upon the lower plate of the compressor. During this backward movement the plunger itself holds down the lower plate of the compressor until at the moment that its end passes off of the plate and the cigarettes are dropped thereon, when the springs $13^g$ force the bottom plate up with the cigarettes thereon, when they are caught and held between the two plates until the movement of the upper plate forces them down in position to receive the front end of the plunger on its return forward movement, whereby they are forced out of the compressor in form to be enfolded in the wrapper and be properly packed. It will be seen that in this second forward movement of the plunger, while its front end is forcing the cigarettes forward into the folding, pasting, and packing devices, it goes through the original operation of holding down the lower plate of the compressor, while the overlapping piece $9^a$ takes off two other rows of cigarettes lying between the partitions in the lower part of the distributing-box, drops them upon the face of the plunger in front of the overlapping piece and within the compressor-box, and this operation is consecutively repeated with other supplies of cigarettes or packages.

The paper or other suitable material for folding around the article to be packed is cut in proper forms on a ribbon 15 and placed around a bobbin $15^a$. These forms are stamped out on the ribbon so as to be easily separated therefrom and are guided over an idle pulley to pass down into a compartment lying in front of the compressor-box and between the article to be wrapped and the folding devices, where it is caught and held suspended, resting upon its lower edges $15^d$, free to be thrust forward by the article to be wrapped, and is now ready to receive the article and be doubled over it when thrust forward by the end of the plunger on its next forward trip. This wrapper may be dropped into the compartment by any suitable contrivance arranged to operate in unison with the devices of the machine. The mechanism illustrated here for this purpose consists of a cam 17, Figs. 1 and 3, suitably mounted on a shaft $17^a$ and operated by gearing which takes its movement from the shaft 3. A lever 18, pivoted to the frame at $18^a$, is held up by the spring $18^b$. The cam acts upon this lever to force it down. The guide-pieces 19 carry the sliding block $19^a$, which latter is provided with a pin which enters the slot in the end of lever 18. The sliding block carries the upright rod $19^b$, which moves up and down with the lever, Figs. 1, 3, and 9.

Secured to the frame is a base 20, Fig. 9, which supports the upright tube $20^a$. A slot is cut in the tube at $20^b$, and within the tube is inserted the rod $20^c$, which is provided with a lug or button $20^d$, which projects through the slot $20^b$. Above the tube the rod $20^c$ is bent at right angles and is provided at its end with a disk $20^e$, whose function is to clasp the wrapper at proper time and hold it, so that a form may be torn from the ribbon. A sleeve 21 surrounds the tube, to which is secured the upper end of the rod $19^b$, and slides upon the tube as the rod moves up and down. The sleeve is provided with the slot $21^a$. As the sleeve moves down the button $20^d$ enters the slot and the rod $20^c$ is turned thereby until the disk $20^e$ contacts with the wrapper-form and holds it against the idle roller, over which the ribbon is passed, while other movements of the devices tear the form from the ribbon and direct it to be dropped in position in front of the article to be wrapped. The upward movement of the sleeve releases the disk from the ribbon, leaving it free to continue its movement and supply another form.

22, Fig. 11, is a clasp or pincers which is secured to the sleeve by a bolt $22^a$, which also acts as a pivot. Back of this pivotal point the clasp is constructed to embrace the tube $20^a$, while the front arms of the clasp are held open by the spring $22^b$. At the rear end there is an opening $22^c$, in which is inserted the bar $22^d$, which is wedge-shaped on its upper part. This bar is carried by the lugs $22^e$, secured to the sleeve. As the clasp moves up with the sleeve the top of the bar strikes against the bracket $22^f$, secured to the tube $20^a$. This action forces the bar into the opening $22^c$ and closes the clasp on the wrapper-form. As the sleeve moves down it draws the wrapper-form with it until it reaches a point where the form should be detached from the ribbon. At this point the disk $20^e$ closes upon the form and holds it, while the clasp still continues to move downward, detaching one of the forms from the ribbon and directing it to fall in proper position until the end of the bar $22^d$ strikes against the base 20, shoving the bar out of the opening and allowing the springs $22^b$ to release the clasp, when the form falls in its proper place in front of the article to be wrapped, to be forced forward by the article itself, impelled by the end of the plunger 9 directly into the folding device. (See Fig. 4.) This folding device is illustrated clearly in Figs. 14, 15, 16, and 17, while the forms assumed by the wrapper in passing through the folding device is shown in Figs. 23 to 28, inclusive.

Seated immediately above and over the folding device is the mechanism for applying paste to the wrapper, and as this mechanism performs its function in part while the wrapper is passing through the folder I will describe it here, viewing Figs. 12 and 13.

Suitably mounted in supporting-brackets attached to the frame of the machine is the shaft 23, which receives its motion from the main shaft 3 through the vertical rod $23^k$. On this shaft are secured the vertical wheels $23^a$ and also the bevel-wheels $23^b$, which turn the upright rods $23^c$ and $23^d$, to which are secured the horizontal wheels $23^e$, $23^f$, and $23^g$. A grooved wheel $23^h$ is mounted in the frame and revolved by sprocket-wheel and chain $23^i$ from the shaft 23. As this grooved wheel lies centrally in line with the paste-wheel $23^g$, the periphery of the latter revolves in the groove of the wheel $23^h$.

Figure 24:
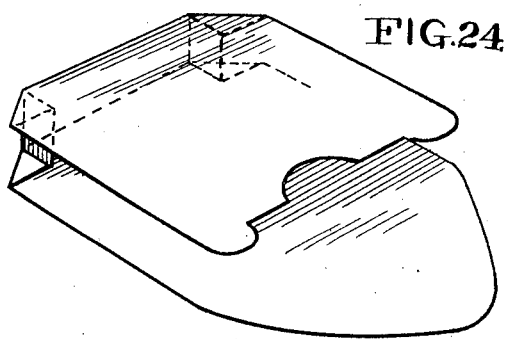
Figure 25:
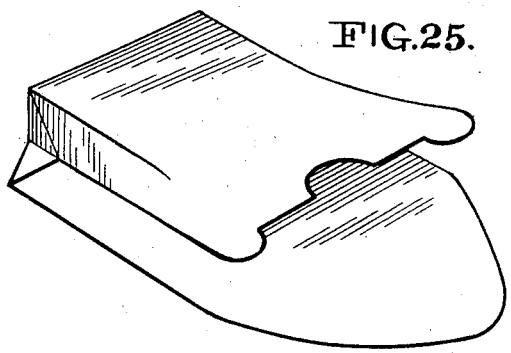
Figure 26:
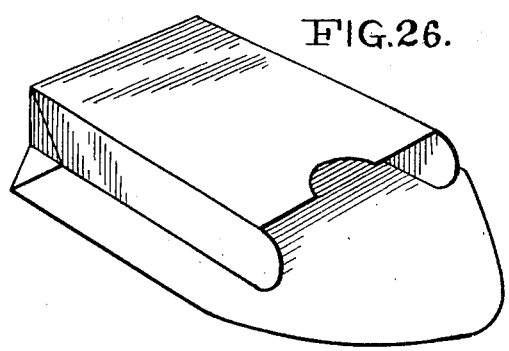
Figure 27:
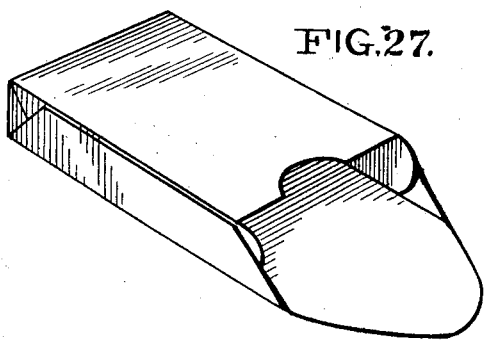
Figure 28:
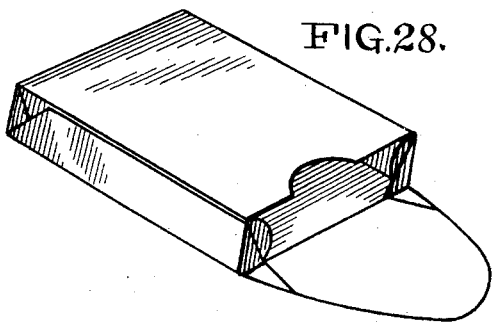

From the upright bar $24^p$ projects an arm $24^r$, upon the end of which the paste is placed, and as the wheel $23^h$ revolves this groove scrapes the paste from the bar, which is in turn scraped from the groove upon the upper surface of the wheel $23^g$, and as the edge of this wheel underlaps the edges of the wheels $23^e$ and $23^f$ the paste is transferred to the lower surfaces of these wheels, which in their turn transfer the paste to the rims of the wheels $23^a$, and these latter wheels transfer it to the lower margins of the wrapper as it passes through the folder. While the wrapper stands between the article to be wrapped and the folding devices, Figs. 14, 15, and 16, the plunger moves forward, pushing in front of it the cigarettes or other article to be packed, which strikes the pliable wrapper, forcing it into the folder, which doubles upon the cigarettes in the form shown in Fig. 23, leaving a margin of the wrapper above and below around the article over which it is to be doubled. As it proceeds the forward corners of the wrapper contact with the pieces 24 at the entrance of the folder, Figs. 14, 15, 16, and 17, which turn the corners inwardly, as shown in Fig. 24. The package then passes between the flanges $24^a$, turning down the top margin of the wrapper over the sides of the article within and leaving the lower margin of the wrapper projecting to receive the paste, Figs. 25 and 26. These lower margins pass under the paste-wheels $23^a$; but as there is a space between the margin and the periphery of these wheels the margins must be lifted to bring them in contact, which is done by the following appliances: Two levers $24^b$ are suitably fulcrumed in the frame, their inner ends $24^d$ projecting into the folding-box through an opening $24^c$. Their outer ends lie directly under the paste-wheels $23^a$, and the lower margins of the wrapper lie between the two. As the package passes through the folder it rides upon the ends $24^d$, forcing these ends down and the other ends up, thereby lifting the margin of the wrapper to contact with the paste-wheels and receive the paste. The package proceeds until the lower margins strike against the projections $24^e$, when these margins, now supplied with paste, are doubled up over the top margins, to which they adhere, as shown in Fig. 27.

A rotary box 25 of capacity to receive the package, having open ends, stands ready to take the package, as shown in Fig. 13. The plunger 9 continues its forward movement and forces the package into this box. The plunger is now at the end of its stroke and ready to return and perform its work on another package. In the top of the box there is an opening $25^a$, Figs. 5 and 13, which leaves a part of the wrapper exposed to receive paste at a point where the lip or flap when doubled over will touch. The devices for applying paste to this part of the wrapper are arranged as follows: A bent wire or rod $25^b$, Figs. 5 and 12, is suitably mounted and pivoted in the framework of the pasting devices, having an arm extending beyond the frame and bent down, as shown at $25^c$. On the part of the rod formed in the shape of a parallelogram is placed a small rotating wheel $25^d$, which when in normal position lies in contact with the grooved wheel $23^h$ and from it receives the paste. On the upright shaft $23^k$ there is placed a pin $23^m$. As the shaft revolves this pin strikes the bent arm $25^c$, throws down the wheel $25^d$, which enters the opening $25^a$ of the box and supplies the paste to the exposed part of the package within the box, which is now ready to receive the projecting lip of the wrapper.

Mounted on the shaft 3 is a cam 26, Fig. 3, which acts upon the pivoted lever $26^a$, to which is attached the sprocket-chain $26^b$. This chain passes over a loose wheel $26^c$ on the shaft of the rotating box. The wheel is provided with a pawl $26^d$, which engages with a notch $26^e$ and at the proper time turns the box. The other end of the chain is attached to the spring $26^f$, Fig. 4, which returns the loose wheel and its pawl to starting-point to give the box another turn at the proper time.

Figure 29:
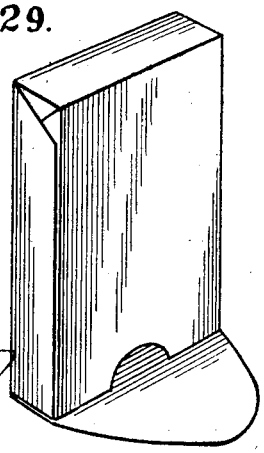
Figure 30:
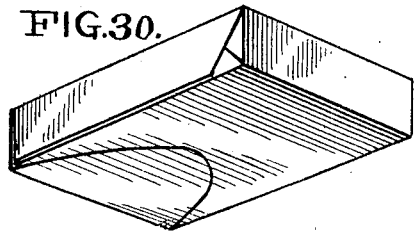

Below the box is a curved plate $25^e$, Figs. 3 and 13, and as the box turns the projecting lip or flap of the wrapper is doubled over by contact with the curved plate, assuming the form shown in Fig. 29 and presenting the other end of the wrapper to the final receptacle for the finished package. This receptacle is shown as a drum provided with openings or boxes $27^a$ of suitable form to receive the package. As before described, the plunger 9 after placing the package in the rotary box 25 has gone back and returns, pushing before it another package. This package in entering the box forces out the one already there into the receptacle $27^a$ and as it enters folds down the flap over the wrapper, which, being already supplied with paste, adheres to the material and completes the package. The drum is provided on its circumference with the pins $27^b$, and the box 25 in turning strikes one of these pins and turns the drum, presenting the next succeeding receptacle to the succeeding package. This operation continues until the receptacles in the drum are filled, when, the plunger forcing a package into the box 25, the package already in the box forces out the one in the receptacle opposite thereto, when it falls out into a receiver 28 or on a table placed there for the purpose.

The receiving-box shown in Fig. 22 is a modification of that shown in Fig. 18 and is intended for cakes of soap, cards, chocolates, and the like, which are packed in the commercial forms of those articles, and unlike cigarettes, do not require collecting and adjusting. When this box is used, the articles are piled within it as high as the upright bars will allow, and the plunger in its passage takes off the lowest and passes it on.

The box is made adjustable for articles of different sizes. When a stiff cardboard is used in wrapping delicate articles, like cigarettes, which are liable to be injured in folding the wrapper, I use the protecting-plates shown in Figs. 3 and 13 at $9^e$. These plates are placed on each side of the plunger 9 and operate as follows: A pin $9^f$ is carried by the plunger 9 and arranged to be vertically movable. This pin passes through a slot $9^h$ in the plates and normally rests at the bottom of the downwardly-bent end of the slot, as shown on Fig. 3. When in this position, the ends of the plates pass beyond the end of the plunger, so as to inclose the article to be packed and protect it from injury, while the thick wrapper is doubled about the sides, the pin thrusting the plates forward as the plunger advances until the pin rides up on the inclined lug $9^i$, bringing it in line with the horizontal part of the slot, when the plates stop and the plunger moves on, the pin riding in the slot, as shown in Fig. 13.

It will be seen from the above description that the plunger 9 and its attachments in their forward movement impel the article to be wrapped and its wrapper through the various devices of the machine until delivered into its final receptacle; that the article itself is its own mandrel, dictating the form of the package without recourse to molds or separate forming devices; that the wrapper is held in proper position by its own weight, free to be moved forward by the article when forced against it; that the folding is done by devices that are all stationary except the article and its wrapper, and the machine uses no preparatory or moving folding devices for a wrapper into which the article is to be afterward inserted.

Having described the invention, what I claim is—

1. In a machine for wrapping articles in packages, a receptacle for receiving the articles, means for collecting and adjusting them in the receptacle in proper form to be wrapped, a compressing device lying in line with the article to be packed, said device provided with means for compressing and compacting the articles together, a feeding-plunger, a folding device, a pasting device and a receptacle for the packages lying in line with the plunger, in combination with devices for reciprocating the plunger and thereby forcing the article out of one of the devices into another successively.

2. In a wrapping-machine, assembling mechanism, wrapping mechanism, and means for advancing the assembled articles from the assembling-station toward the wrapping mechanism including a plunger having a portion to support the articles advanced, and a overhanging portion for pushing the articles.

3. In a wrapping-machine, assembling mechanism including a supporting-plate, wrapping mechanism, and means for advancing the assembled articles from the assembling-station toward the wrapping mechanism including a plunger having a part movable below the plate, and a second part movable above the plate, the latter acting as a stop in the retractile movement of the plunger to arrest the articles deposited by the second part of the plunger on the first part.

4. In a machine for wrapping articles in packages, a receptacle for holding the article to be packed, wrapping mechanism, a reciprocating plunger provided with devices for removing the article to be packed from the receptacle by its forward movement, devices for removing the article from the plunger in its backward movement, and delivering them into a compressor, in combination with a compressor having means for supporting the article and presenting it to the end of the plunger on its next forward movement.

5. In a machine for wrapping articles in packages, a reciprocating plunger, wrapping mechanism, protecting-plates $9^e$ arranged to project beyond the end of the plunger to thereby embrace and protect the sides of the article to be wrapped during the folding of the wrapper, said plates provided with the slots $9^h$, in combination with a vertically-movable pin $9^f$, carried by the plunger and projecting into the slot, whereby the plate is thrust forward when the pin rests in the vertical part of the slot, and means for moving the pin into the horizontal part of the slot, and thereby arrest the plate, while the plunger continues its forward movement.

6. In a machine for wrapping articles in packages, a box to receive the package open at both ends and a reciprocating plunger for forcing the package into the box, leaving the lip of the wrapper unfolded, in combination with mechanism for turning the box end for end, devices arranged to contact with the lip of the wrapper while the box is turning and thereby double over said lip, and means for arresting the movement of the box when turned end for end, and present the other end of the package to the plunger on its next forward movement.

7. In a packaging-machine and in combination, assembling mechanism, wrapping mechanism and means for advancing the articles to be wrapped from the assembling mechanism through the wrapping mechanism, the latter including an open-ended box to receive the partly-folded package, having cut-out walls, paste-applying mechanism operating on the box through said cut-out portion, and means coöperating with the box.

8. In a machine for wrapping articles in packages, a receiving-box for the package open at both ends and having a cut-out opening to receive paste on its wrapper, means for forcing the package into the box leaving the lip of the wrapper unfolded, devices for applying paste to the wrapper through the opening in the box, a curved plate located below the box, to retain the package and double the lip of the wrapper while the box is turning, in combination with devices for turning the box end for end.

9. In a machine for wrapping articles in packages, a revolving wheel or drum, provided with a series of receptacles for receiving the finished package in combination with a rotating box, means for forcing the package from the box into one of the receptacles in the drum, thereby doubling over and adhering the flap of the wrapper, means for rotating the box and means actuated by the box for rotating the drum to advance the same.

10. In a machine for wrapping cigarettes in packages, a receptacle for the cigarettes including a frame provided with guide-slots and partitions providing a series of compartments, each partition comprising an upper and lower part hinged together at their junction, those forming the upper part having their top edges inserted in the slots in the frame of the machine, in combination with devices for approaching the lower parts of the partitions to thereby adjust and compact the cigarettes lying in the spaces between them.

11. In a machine for wrapping cigarettes in packages, a receptacle for the cigarettes, each partition formed in an upper and a lower part and hinged together at their junction, devices for approaching the lower part of the partitions to thereby adjust and compact the cigarettes lying between them, in combination with a slotted plunger and means for reciprocating the same to thereby contact with the cigarettes and force them out of the receptacle.

12. In a machine for wrapping articles in packages a wrapper-supplying device a clamp for engaging the wrapper and means for moving the clamp to draw the wrapper from its bobbin in combination with devices for holding the ribbon of wrapper-forms while the clamp is drawing the wrapper, to thereby detach the form from its ribbon and means for opening the clamp to allow the wrapper to drop in position to receive and enfold the article to be packed.

13. In a machine for wrapping articles in packages, a compressing device formed of two movable plates with a space between them for receiving the article to be wrapped, means for conveying the article to be wrapped into the compressing device and between the plates, in combination with a reciprocating plunger to force the article out of the compressing device and mechanism for presenting the article in front of the plunger.

14. In a machine for wrapping articles in packages, a folder and means for impelling the article and its wrapper therethrough, in combination with a pasting mechanism located over the folder, provided with pasting-wheels lying above the unfolded lower margins of the wrapper, two levers whose outer ends lie below the margins of the wrapper, and having their inner ends exposed to contact with the package in passing through the folder, whereby the levers are operated and the lower margins of the wrapper lifted to contact with the pasting-wheels.

15. In a packaging-machine, the combination with a plunger for feeding articles, of a rotatable holding device provided with a channel therethrough in which an article may be held, means for applying paste to the box while the same is in the holder, means for moving the holder half a revolution to bring the opposite end of the channel before the feeding-plunger and a folder for folding the flap of the box while the holder is being rotated.

16. In a packaging-machine, the combination of a support for the articles to be wrapped, a reciprocating plunger provided with parallel longitudinally-projecting fingers for advancing the articles, means for feeding wrappers across the path of movement of the plunger, and stationary folding means for folding the wrapper around the end and sides of the article as the same is being moved along the support.

17. In a packaging-machine, the combination of a support for the articles to be wrapped, the reciprocating plunger provided with parallel longitudinally-projecting fingers for advancing the articles, means for feeding wrappers across the path of movement of the plunger, stationary folding means for folding the wrapper around the end and sides of the article as the same is being moved along the support and means for applying paste to the wrapper as the same is being moved along.

18. In a packaging-machine, the combination of a support for the articles to be wrapped, a reciprocating plunger provided with parallel longitudinally-projecting fingers for advancing the articles, means for feeding wrappers across the path of movement of the plunger, stationary folding means for folding the wrapper around the end and sides of the article as the same is being moved along the support, a reversing-box having a channel in line with the plunger to receive the article at the end of the movement of the plunger, means for giving the box a partial revolution, and a receptacle for receiving the package from the box.

19. In a packaging-machine, the combination of a support for the articles to be wrapped, a reciprocating plunger provided with parallel longitudinally-projecting fingers for advancing the articles, means for feeding wrappers across the path of movement of the plunger, stationary folding means for folding the wrapper around the end and sides of the article as the same is being moved along the support, a reversing-box having a channel in line with the plunger to receive the article at the end of the movement of the plunger, means for giving the box a partial revolution, means for folding the end of the flap of the wrapper during the rotation of the box, and a receptacle for receiving the package from the box.

20. In a packaging-machine, the combination, with a support for the articles to be wrapped, a reciprocating plunger provided with parallelly-disposed longitudinally projecting fingers for advancing the articles, and means for feeding wrappers across the path of movement of the plunger, of stationary folding means for folding the wrappers around the forward ends and sides of the articles as such articles are being moved along the support, and means for applying paste to the wrappers when undergoing this movement.

21. In a packaging-machine, the combination, with a support for the articles to be wrapped, a reciprocating plunger provided with parallelly-disposed longitudinally-projecting fingers for advancing the articles, means for feeding wrappers across the path of movement of the plunger, and stationary folding means for folding the wrappers around the front ends and sides of the articles as the same are being moved along the support, of a box having a channel in line with the plunger to receive the articles at the ends of the successive advancing movements of the plunger, means for giving the box a partial rotation, and a receptacle for receiving the packages from such box.

22. In a packaging-machine, the combination, with a support for the articles to be wrapped, a reciprocating plunger provided with parallelly-disposed longitudinally-projecting fingers for advancing the articles, means for feeding wrappers across the path of movement of the plunger, and stationary folding means for folding the wrappers around the forward ends and sides of their respective articles as the same are being moved along the support, of a box having a channel in line with the plunger to receive the articles at the ends of the successive advancing movements of the plunger, means for giving the box a partial rotation, means for coöperating with the box to fold the rear end flaps of the wrappers upon the package during the rotation of such box, and a receptacle for receiving the packages from said box.

23. In a packaging-machine, a box to receive the package open at both ends, and a reciprocating plunger for forcing the package into the box, leaving the rear flap of the wrapper unfolded, in combination with mechanism for turning the box end for end, devices arranged to contact with the flap of the wrapper while the box is being turned and thereby double over said flap, and means for arresting the movement of the box when turned end for end and presenting the other end of the package to the plunger on its next forward movement, substantially as described.

24. In a packaging-machine, a box for receiving the package open at both ends and having an opening to expose the wrapper for receiving paste, in combination with devices for forcing the package into the box, leaving the rear flap of the wrapper unfolded, and means for applying paste to the wrapper in the box through the opening, substantially as described.

25. In a packaging-machine, the combination with a support for the article to be wrapped, a reciprocating plunger provided with parallelly-disposed longitudinally-projecting fingers for advancing the article, and means for feeding wrappers across the path of movement of the punger, of stationary folding means for folding the wrapper around the forward end and sides of the article as the same is being moved along the support.

AGAPITO ANITUA.

Witnesses:
BARILIO ZAVARONETS,
HONORATO COLETE.